United States Patent [19]

Waltman et al.

[11] Patent Number: 4,679,543
[45] Date of Patent: Jul. 14, 1987

[54] HOLDER FOR RETAINING REFRACTORY MATERIALS

[75] Inventors: John H. Waltman; Wesley J. Stewart, both of Pontiac; Gerald E. Leroux, Clarkston, all of Mich.

[73] Assignee: JWG Enterprises, Pontiac, Mich.

[21] Appl. No.: 830,219

[22] Filed: Feb. 18, 1986

[51] Int. Cl.⁴ ............................................. A47J 37/00
[52] U.S. Cl. ................. 126/25 R; 126/41 R; 126/9 R; 126/92 AC; 206/515; 220/8
[58] Field of Search ............ 126/92 AC, 41 R, 25 R, 126/9 R, 9 B, 9 A; 44/2, 11, 40; 99/339; 220/2, 8; 206/216, 505, 515

[56] References Cited

U.S. PATENT DOCUMENTS

| | | | |
|---|---|---|---|
| 745,025 | 11/1903 | Porter | 431/326 X |
| 1,296,624 | 3/1919 | Clark | 220/8 X |
| 1,388,296 | 8/1921 | Petersen | 220/8 X |
| 2,058,172 | 10/1936 | Myers | 126/25 R |
| 2,912,785 | 11/1959 | Nudell | 220/8 X |
| 3,140,651 | 7/1964 | Barnett | 99/339 |
| 3,244,163 | 4/1966 | McGlaughlin | 126/25 R |
| 3,474,724 | 10/1969 | Jenn | 126/41 X |
| 3,692,013 | 9/1972 | Grafton et al. | 126/41 R |
| 4,089,258 | 5/1978 | Berger | 99/339 |

Primary Examiner—Randall L. Green
Attorney, Agent, or Firm—Basile, Weintraub & Hanlon

[57] ABSTRACT

A holder for retaining refractory materials with adjustable upper and lower trays, which accommodate and hold securely therebetween the refractory materials. The holder comprises a lower tray having an open bottom mesh, and an upper tray with an open top mesh. The upper tray is telescopically received by the lower tray. Adjustable spacing between the upper and lower tray provides for secure retention of a uniformly distributed layer of radiant refractory material, thus offering a relatively constant dissipation of heat. The adjustable feature is provided by the accommodation of fasteners which extend generally horizontally from the side of the lower tray within vertical slots which are defined within the side walls of the top tray. The holder also provides a convenient means for cleaning the refractory materials after they have become soiled in use.

1 Claim, 6 Drawing Figures

U.S. Patent    Jul. 14, 1987    4,679,543
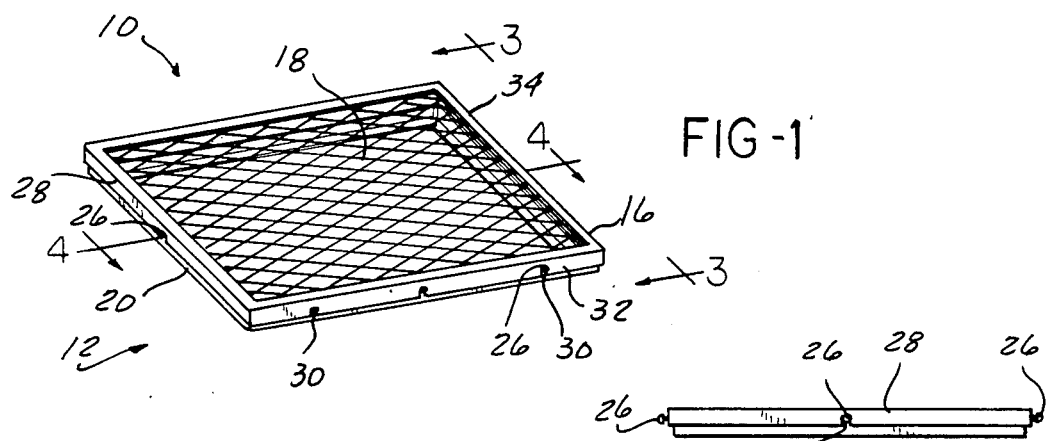
FIG-1
FIG-3
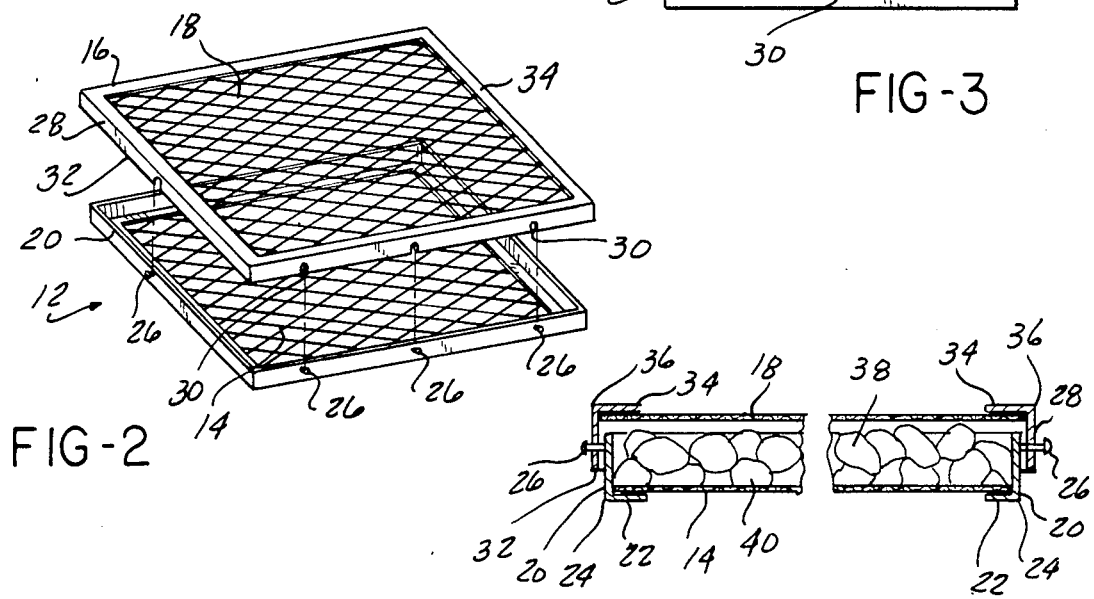
FIG-2
FIG-4
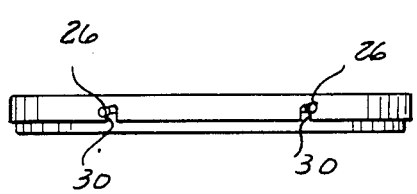
FIG-6
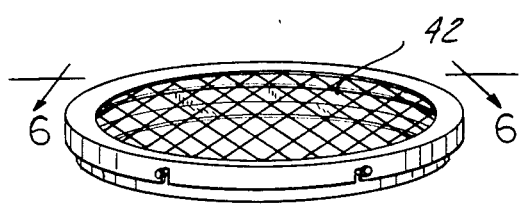
FIG-5

HOLDER FOR RETAINING REFRACTORY MATERIALS BACKGROUND OF THE INVENTION

1. Field of the Invention:

This invention relates generally to an improved holder for retaining refractory materials which retain sources of radiant heat. More particularly, the invention is directed to an adjustable holder having a lower tray with an open bottom mesh, which telescopically and adjustably receives an upper tray with an open top mesh. Sandwiched therebetween is a uniform layer of refractory materials, such as cinder, stone, brick, volcanic briquettes, and the like.

2. Description of the Prior Art:

Perforated frame-like refractory material holders for use in barbeque units for preparing food outdoors on a grill have previously been used as sources of radiant heat. U.S. Pat. No. 4,089,258 to Berger discloses a portable barbeque unit with a gas fired, vertically disposed heat source for roasting spit-mounted food. The vertical heat source includes an upstanding panel of radiant material extending along a tubular gas burner. A modification of Berger's device combines the upstanding radiant panel with a horizontally disposed bed of radiant material underlying the spit, and heated by an auxiliary gas burner. However such grills provide a random arrangement of briquettes. This results in an uneven combustion, which, together with the ignition of grease which drops from the food being cooked, results in an irregular rate of heating.

U.S. Pat. 3,140,651 to Barnett discloses a charcoal cooker wherein the food-carrying grill is suspended in its vertical position, so that the drippings from meat or other food will not drip upon live coals to cause unsavory odors or appearance. Problems associated with cooking, for example, strips of steak on Barnett's cooker however, remain. Such problems include the unsightliness and unappetizing odors of the briquettes after being splattered with grease at a high temperature.

Other problems also beset approaches found in the prior art. The relative looseness with which the briquettes are retained in prior art devices is such that the briquettes can readily move around, especially when the portable grill is moved from one place to another. After the briquettes become dislodged, a non-uniform layer of briquettes, and therefore a non-uniform source of radiant heat, is created. The cleaning of devices found in the prior art is relatively inconvenient, and requires the wearing of gloves to avoid the transmission of dirt onto the person.

The present invention is directed to overcoming one or more of the problems set forth above.

SUMMARY OF THE INVENTION

In one aspect of the present invention, the holder for retaining materials includes a lower tray having an open bottom mesh and an upper tray having an open top mesh, the upper tray being telescopically received by the lower tray. The holder also includes means for releasably securing the upper tray to the lower tray at selected points of reception.

More specifically, the holder of the present invention incorporates in its structure a lower tray which includes one or more lower vertical side walls, and a lower horizontally-projecting flange to which the bottom mesh is secured. The flange is connected to the bottom edge of the one or more side walls. Additionally, a plurality of means for fastening the upper tray to the lower tray extends generally horizontally from the one or more side walls of the lower tray.

The upper tray includes one or more upper vertical side walls defining a plurality of vertical slots in the bottom edge thereof. An upper horizontally projecting flange, to which the open top mesh is secured, is connected to the top edge of the one or more side walls. Thus, the refractory materials are contained within the area which is adjustably defined by the telescopically received upper and lower trays.

It is therefore an object of the present invention to provide a holder for refractory materials which is especially adapted to be adjustable in the vertical plane, so that a uniform distribution of refractory materials is achieved between the upper and lower trays.

It is a further object of the present invention to enclose the refractory materials by an adjustable means, so that the materials may be securely contained between the upper and lower frames, regardless of whether large, or small-sized materials are used.

Another object of the invention is to provide a more efficient source of radiant heat, in which the heat dissipated by the refractory materials is augmented by the upper and lower flanges which respectively are connected to the upper and lower trays.

Still another object of the invention is to provide a means for securing the refractory materials in place, so that they do not become dislodged when a portable grill, within which the holder is mounted, is moved from one cooking site to another.

A further object of the invention is to provide a convenient means for cleaning or replacing the refractory materials so as to retain a savory quality which would be conducive to stimulating the appetite for food, and which would detract therefrom if unsavory smells or an umsightly appearance were associated with the used and soiled refractory materials.

In addition to the numerous advantages apparent from the foregoing discussion, the present invention has the further attributes of economy, ease of construction, and manufacture. Conventional materials which are commercially available can be shaped and assembled with relative ease. Further, the invention is simple, and is durable. Additional facts of the invention, as well as other objects and advantages thereof, will be apparent from the drawings, and the following specific description of the preferred embodiments.

BRIEF DESCRIPTION OF THE DRAWING

For a better understanding of the present invention, reference is made to the accompanying drawing, in which:

FIG. 1 is a perspective view of the holder for retaining refractory materials, with the upper tray telescopically received by the lower tray, in positon for use.

FIG. 2 is a perspective view of the upper and lower trays before the top tray is telescopically received by the bottom tray, positioned vertically below.

FIG. 3 is a side elevation of the refractory material holder from the vantage point of the numeral 3 in FIG. 1.

FIG. 4 is a vertical cross-section of the refractory material holder generally along the line 4—4 of FIG. 1.

FIG. 5 is a perspective view of an alternate embodiment of the invention, wherein the holder generally takes on a cylindrical configuration.

FIG. 6 is a rear view of an alternate embodiment of the refractory material holder from the vantage point of the neutral 6 in FIG. 5.

DESCRIPTION OF THE PREFERRED EMBODIMENTS

Referring now to the drawings, and particularly to FIGS. 1-4, there is illustrated one form of the holder for retaining refractory materials 10, made according to the present invention. The refractory materials holder, generally designated 10, comprises a lower tray 12, an open bottom mesh 14, and an upper tray 16. The upper tray 16 has an open top mesh 18, and is telescopically received by the lower tray 12.

As best shown in FIGS. 2 and 4, the lower tray further comprises one or more lower vertical side walls 20. A lower horizontally projecting flange 22, to which the bottom mesh 14 is secured by conventional methods such as spot welding, is connected to the bottom edge 24 of the one or more lower side walls 20. The lower tray 12 also includes a plurality of means for fastening 26, such as screws, or the like, which extend generally horizontally from the one or more lower side walls 20. The means for fastening 26 may be threaded to receive a means such as a wing-nut (not shown) for releasably securing the upper tray 16 to the lower tray 12.

As best seen also in FIGS. 2 and 4, the upper tray 16 further comprises one or more upper vertical side walls 28. These walls 28 define a plurality of vertical slots 30 in the bottom edge 32 thereof. The upper tray 16 also includes an upper horizontally projecting flange 34 to which the open top mesh 18 is secured. The flange 34 is connected to the top edge 36 of the one or more upper vertical side walls 28. Thus, after the upper tray 16 is telescopically received by, and is mounted vertically down on top of the lower tray 12, there is defined a generally parallelepiped-shaped area 38 for receiving the refractory materials 40.

FIGS. 5 and 6 depict an alternative embodiment, wherein the upper and lower trays together define a generally cylindrical area 42 for receiving the refractory materials 40.

As will be readily understood from the foregoing description, the holder 10 can be readily adjustable in a vertical direction so as to accommodate either a small average size of refractory material 40, or a large, or an intermediately sized refractory material 40. This adjustment is enabled by the vertical slots 30 which receive the fastening means 26. For larger refractory material 40, the upper tray 16 sits generally higher above the lower tray 12 than for smaller material 40.

The materials from which the holder 10 are fabricated generally are treated by conventional means so as to produce non-rusting characteristics. Such treatment, together with the underlying material, should be such as to be non-toxic, and such as not to exude toxic gases in the temperature ranges which accompany the cooking process. Also, the materials selected should be relatively light in weight so as to enhance the desirable features of relative ease of installation, and removal. Without limitation thereto, materials which embody these attributes include stainless, and plain steel. The refractory material holder 10 is fabricated by spot-welding the open bottom mesh 14 to the lower horizontally projecting flange 22 of the lower tray 12. Similarly, the open top mesh 18 is spot-welded to the upper horizontally projecting flange 34 of upper tray 16.

In operation, the holder 10 is assembled by arranging a layer of refractory materials 40 such as cinder, stone, brick, volcanic briquettes, and the like on top of the open bottom mesh 14 so as to form a relatively uniform distribution of materials 40 over the mesh 14. The upper tray 16 is then lowered in a vertical direction so that it is telescopically received by the lower tray 12, after aligning the vertical slots 30 with the horizontally protruding fastening means 26.

The assembled holder of refractory materials 10 is then mounted by conventional means over a gas-fired grill, which is known in the art. Various sizes of holder 10 can be manufactured so as to be fitted to the different models of grills with which the holder 10 is to operate.

After use, or as often as is desired, the holder 10 is simply removed from the grill, and is hosed down, thus cleansing the refractory materials 40 by separating unwanted food residue and eliminating unwanted unsavory odors.

Thus, there has been described a holder which solves the problems of non-uniformity of heat distribution by providing adjustably spaced trays 12 and 16, the relative displacement of which can be adjusted by fastening means 26 so as to be adapted to varying sizes of refractory materials 40 used. In this way, the materials 40 are firmly held, and can conveniently be removed together from a grill, and kept together while being cleaned, thus combining the attributes of cleanliness and hygiene, with ease of maintenance. Also, the materials, while sandwiched between the open bottom mesh 14 and the open top mesh 18, are retained in place, and do not become dislodged or lost when a portable grill is moved from one place to another.

WHAT IS CLAIMED

1. In an outdoor gas-fired grill including refractory materials for cooking food with radiant heat, the improvement of an adjustable-refractory-material-retaining holder comprising:

a pair of refractory-material-retaining trays, each member of said pair comprising at least one side wall, a flange integral with and projecting horizontally from an edge of at least one side wall, and a flat refractory-material-retaining open mesh supported by the flange and fastened thereto, wherein one member of said pair of refractory-material-retaining trays may be telescopically received by the other member so that the flat, refractory-material-retaining open meshes thereof are in substantially parallel, spaced-apart relation with respect to each other;

a plurality of vertically disposed slots formed in the at least one side wall of one member of the pair of refractory-material-retaining trays; and a plurality of screws extending horizontally from the at least one side wall of the other member of the pair of refractory-material-retaining trays at locations thereon corresponding to the locations of the plurality of slots, each of said plurality of screws being capable of being passed through its corresponding slot and tightened down at a selected position along the vertical length of the corresponding slot for adjustably fastening the pair of refractory-material-retaining trays together to accommodate refractory material of varying sizes, the selected position chosen at a distance apart sufficient to retain a selected refractory material of particular size between the pair of refractory-material-retaining trays.

* * * * *